United States Patent [19]

Fasciati et al.

[11] 3,971,738

[45] July 27, 1976

[54] HEAVY METAL COMPLEXES OF AZO COMPOUNDS CONTAINING A HALOGENO-2,3-DIHYDROXY PYRIDINE COUPLING COMPONENT

[75] Inventors: Alfred Fasciati, Bottmingen, Switzerland; Gerhard Back, Loerrach, Germany

[73] Assignee: Ciba-Geigy AG, Basel, Switzerland

[22] Filed: Nov. 14, 1973

[21] Appl. No.: 415,578

Related U.S. Application Data

[63] Continuation-in-part of Ser. No. 374,708, June 28, 1973, abandoned, which is a continuation of Ser. No. 136,599, April 22, 1971, abandoned.

[30] Foreign Application Priority Data

Apr. 23, 1970 Switzerland.......................... 6071/70

[52] U.S. Cl. .................. 260/146 R; 260/145 B; 260/146 D; 260/146 T; 260/153; 260/154; 260/155; 260/156; 260/158; 260/160; 260/162; 260/163; 260/169; 260/173; 260/176; 260/186; 260/187; 260/191; 260/193; 260/194; 260/195; 260/196; 260/197; 260/198; 260/199; 260/200; 260/201; 260/206; 260/207; 260/297 R

[51] Int. Cl.² .................. C09B 45/14; C09B 45/24; C09B 45/34

[58] Field of Search ........ 260/146 R, 146 D, 146 T, 260/156, 153, 154, 145 B

[56] References Cited

UNITED STATES PATENTS 2,294,380   9/1942   Braker ............................... 260/156

OTHER PUBLICATIONS

Ames et al., Chemical Abstracts, vol. 49, pp. 315–316 (1955).
Freeman et al., J. Amer. Chem. Soc. vol. 78, pp. 2678–2682 (1956).
Gattermann et al., Deut. Ber. Chem. vol. 49, pp. 494–501 (1916).
Rydon et al., Chemical Abstracts, vol. 58, pp. 7903–7904 (1963).
Geigy, Chemical Abstracts, vol. 71, p. 276, 38810t (1969).

*Primary Examiner*—Charles F. Warren
*Attorney, Agent, or Firm*—Joseph G. Kolodny; Edward McC. Roberts; Prabodh I. Almaula

[57] ABSTRACT

Azo compounds of the formula

D-N=N-K        (1)

wherein D denotes the radical of an aromatic diazo component and K denotes the radical of a halogeno-2,3-dihydroxy-pyridine, as well as heavy metal complexes of azo compounds of the formula (1).

3 Claims, No Drawings

HEAVY METAL COMPLEXES OF AZO COMPOUNDS CONTAINING A HALOGENO-2,3-DIHYDROXY PYRIDINE COUPLING COMPONENT

CROSS-REFERENCE TO RELATED APPLICATION

This is a continuation-in-part application of our copending application Ser. No. 374,708, filed June 28, 1973, now abandoned, which in turn is a continuation of application Ser. No. 136,599, filed Apr. 22, 1971 now abandoned.

The present invention relates to azo compounds which correspond to the formula $$D-N=N-K \quad (1)$$

wherein D denotes the radical of an aromatic diazo component, and K denotes the radical of a halogen-2,3-dihydroxypyridine. It furthermore relates to heavy metal complexes of azo compounds of the formula (1).

Valuable azo compounds of the type according to the invention are those of the formula

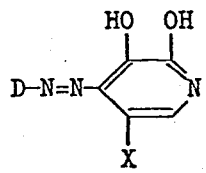

(2)

wherein D has the same meaning as in the formula (1) and X denotes a halogen atom, such as, for example, a fluorine, chlorine or bromine atom.

Compounds of particular interest are the heavy metal complexes of the azo compounds of the formula (2), wherein, for example, iron, manganese, nickel, copper and especially cobalt and chromium can be used as complex-forming metals. The heavy metal complexes can contain one or two molecules of azo compounds of the formula (2) bonded to one metal atom (1:1-complexes and 1:2-complexes, respectively). In 1:2-complexes it is however also possible for one of the two ligand molecules to be an azo compound which does not contain the radical of a halogeno-2,3-dihydroxypyridine as the coupling component, that is to say, for example, a compound of the benzene azobenzene type, which contains appropriate complex-forming groups. A possible coupling component in formula (2) is, especially, the radical of 5-chloro-2,3-dihydroxy-pyridine or 5-bromo-2,3-dihydroxy-pyridine.

The diazo component D represents an aromatic radical which can itself contain an azo group or is derived from a compound of the anthraquinone nitroaryl, phthalocyanine or stilbene series or the like. In particular, D is a benzene or naphthalene radical. The diazo component D can be substituted by hydroxy, carboxy, chloro, bromo, lower alkyl, aryl, especially phenyl, lower alkoxy, aryloxy, especially phenyloxy, nitro, sulfo, sulfonamido, sulfonamido mono-or disubstituted at the nitrogen atom by lower alkyl, hydroxyalkyl, lower alkoxyalkyl, cyanoalkyl, aralkyl especially benzyl, $C_5$–$C_9$-cycloalkyl especially cyclohexyl or aryl especially phenyl, carboxyphenyl, methylphenyl, nitro- or chlorophenyl; lower alkylsulfonyl, lower hydroxy-, chloro-, or cyanoalkylsulfonyl, arylsulfonyl, such as phenylsulfonyl, chlorophenylsulfonyl and methylphenylsulfonyl, acylamino, lower alkanoyl, benzoyl and arylazo. Herein "aryl" means phenyl and phenyl substituted by chloro, bromo, nitro, sulfo, carboxy, lower alkyl and lower alkoxy; the term "lower" designates residues containing not more than 5 carbon atoms and "acylamino" designates amino substituted by lower alkanoyl, lower alkoxycarbonyl, lower alkylsulfonyl, aroyl, arylsulfonyl or a fibre-reactive acyl radical, such as chloro,-bromo- or sulfato substituted lower alkanoyl or alkylsulfonyl, lower alkenoyl optionally substituted by chloro or bromo, chloro- or bromo -substituted triazinyl and pyrimidyl, 2,6-dichloropyrimidine-5-carbonyl, 2,3-dichlorochinoxaline-7-carbonyl-, 1,4-dichlorophthalazine-7-carbonyl.

Examples of suitable acylamino groups are acetylamino, propionylamino, ethoxycarbonylamino, methylsulfonylamino, benzoylamino, chloro-, nitro- or methylbenzoylamino, phthaloylamino phenylsulfonylamino, chloro-, nitro- or methyl phenyl sulfonylamino, chloroacetylamino, $\alpha,\beta$-dibromopropionylamino, $\beta$-sulfatoethylsulfonylamino, acryloylamino, $\alpha$-bromoacryloylamino, 2,4-dichlorotriazinylamino, 2-chloro-4-methoxytriazinylamino, 2-chloro-4-isopropoxytriazinylamino, 2,4,5-trichloropyrimidylamino etc.

When dealing with heavy metal complexes of the compounds according to the invention, the diazo component D must possess a complexforming substituent, such as, for example, a hydroxyl, amino or carboxyl group, in the ortho-position to the azo bridge.

Useful diazo components of the benzene series for metallizable dyestuffs of the formulae (1) or (2) are those of the formula

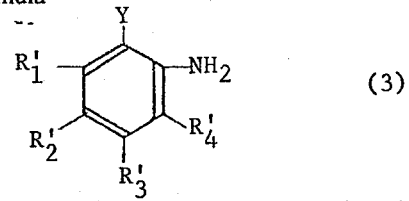

(3)

wherin Y is hydroxy, methoxy or carboxy and $R_1'$, $R_2'$ and $R_3'$ are each independently hydrogen, chloro, bromo, nitro, sulfo, carboxy, carbonamido, sulfonamido, wherein the amido nitrogen is unsubstituted or mono- or disubstituted by lower alkyl, hydroxyalkyl, lower alkoxyalkyl, phenyl, methylphenyl, chlorophenyl, carboxyphenyl, nitrophenyl, benzyl or cyclohexyl, lower alkylsulfonyl, lower chloro-, hydroxy-, cyano-. or lower alkoxyalkylsulfonyl, lower alkyl, such as methyl, ethyl, t-butyl, neopentyl, lower alkoxy, lower alkanoylamino, lower alkylsulfonylamino, aroylamino, such as benzoyl-, chlorobenzoyl-, methylbenzoyl- or nitrobenzoylamino or phthaloylamino and arylsulfonylamino, such as phenylsulfonyl-, methylphenylsulfonyl-, chloro- or nitrophenylsulfonylamino, a fibre reactive radical such as lower alkanoylamino substituted by chloro or bromo and lower alkenoylamino unsubstituted or substituted by chloro or bromo and $R_4'$ is hydrogen or, when $R_1'$, $R_2'$ and $R_3'$ are chloro, is also chloro.

Useful diazo components of the azobenzene series are those of the formulae

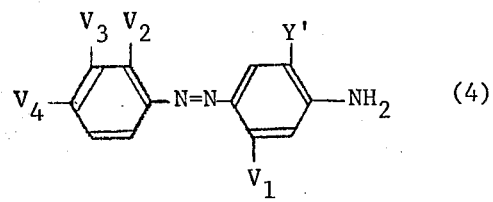

(4)

and

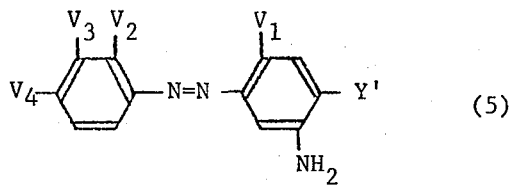

(5)

wherein Y' is hydroxy or methoxy, $V_1$ is lower alkyl or lower alkoxy and $V_2$, $V_3$ and $V_4$ are each independently hydrogen, chloro, bromo, nitro, sulfo, lower alkyl and lower alkoxy.

Amongst the compounds of the formulae (1) or (2) which are not bonded to a heavy metal atom, compounds of interest are both those which do not contain any groups which confer solubility in water, and, especially, those which are water-soluble, that is to say, for example, which contain sulphonic acid groups or carboxylic acid groups. In particular, the compounds can possess one or more than one fibre-reactive radical, such as, for example, a halogenated propionic acid radical.

In heavy metal complexes of azo compounds of the formulae (1) and (2), it is also possible for one or more groups which confer solubility in water to be present. The compounds can also contain one or more reactive groups which, in the case where the heavy metal complex only possesses compounds of the formulae (1) or (2) as ligands, are in particular contained in the diazo components of the azo compounds which are bonded as a complex.

In 1:2-complexes in which, apart from a molecule of a compound of the formulae (1) or (2), an azo compound which does not possess a halogeno-2,3-dihydroxy-pyridine as the coupling component is bonded as the ligand, a reactive radical can in particular also be present in the diazo component or in the coupling component of the azo compounds in question.

Suitable reactive radicals are reactive acyl radicals capable of reaction with the hydroxyl groups of cellulose or the amino groups of polyamides to form a covalent chemical bond. Such groups are acyl radicals containing a removable atom or group, in particular, a low molecular alkanoyl or alkylsuphonyl radical substituted by a removable atom or a removable groups, such as chloro, bromo or sulfato, a low molecular alkenoyl or alkenesulphonyl radical which is optionally substituted by a removable atom or a removable group, a carbocyclic or heterocyclic radical, containing 4-membered, 5-membered or 6-membered rings, which is bonded via a carbonyl or sulphonyl group and is substituted by a removable atom or a removable group, or a triazine or pyrimidine radical which is directly bonded via a carbon atom and is substituted by a removable atom or a removable group, or contains such a radical. The reactive radical of an alkanoyl or alkenoyl, radical which preferable contains halogen atoms and is bonded via a –NH– group, in particular the $\alpha,\beta$-dibromopropionyl radical or $\alpha$-bromoacryloyl radical, is preferred.

The manufacture of the azo compounds of the formula (1) or of the heavy metal complexes in question is effected by coupling a diazotised amine of the formula D-NH$_2$ with a halogeno-2,3-dihydroxy-pyridine, optionally followed by reaction of the azo compound with an agent which donates a heavy metal.

The diazotisation of the amine takes place according to methods which are in themselves known, for example with the aid of hydrochloric acid and sodium nitrite. The coupling with the halogeno-2,3-dihydroxy-pyridine also takes place according to methods which are in themselves known, in an acid to alkaline medium.

The reaction with the agent which donates a heavy metal takes place according to customary processes, in various solvents, such as, for example, water, ethanol, formamide, glycol-ethers, pyridine and others, depending on the solubility of the components, optionally at elevated temperature, and in a weakly acid to alkaline medium.

The manufacture of 1:2-complexes can take place in a single reaction step, by reaction of 1 mol of a compound which donates a heavy metal with 2 mols of appropriate azo compounds, or can take place in stages. In the latter case, an azo compound of the formula (1), manufactured by coupling, is reacted with a preferably chromium-donating agent to give a 1:1-complex, and this is subsequently reacted with an equivalent quantity of an azo compound to give the 1:2-complex. This procedure is advisable particularly if 1:2-complexes with different ligands are to be manufactured. Such 1:2-complexes in which only one of the two ligands is a compound of the formula (1), can also be converted into the desired 1:2-complex by reaction of an azo compound which does not contain any halogeno-2,3-dihydroxy-pyridine as the coupling component, with a chromium-donating agent and subsequent reaction of the resulting 1:1-complex with an appropriate azo compound of the formula (1).

Particularly valuable complex compounds are obtained if cobalt(II) or chromium (III) salts are used as metal-donating agents.

After completion of the coupling reaction, the compounds can, for metallisation purposes, be isolated from the coupling mixture by filtration. They are conveniently used as a filter cake without intermediate drying. In some cases it is also possible to carry out the treatment with the chromium-donating or cobalt-donating agents directly in the coupling mixture, without intermediate separation.

The treatment with the chromium-donating or cobalt-donating agents takes place, according to the present process, through a chromium-containing or cobalt-containing compound being produced, where relevant with an alkyl radical of an alkoxy group possibly present in the o-position relative to the azo group being split off; this compound contains one or half an atom of chromium or half an atom of cobalt, bonded as a complex, per molecule of azo compound. Accordingly, the metallisation is appropriately carried out with those chromium-donating or cobalt-donating agents, and according to those methods which, according to experience, yield complex compounds of this composition. It is generally advisable to use one, or less than one, atom of chromium or cobalt per molecule of an azo dyestuff, and/or to carry out the metallisation in a weakly acid to alkaline agent, if appropriate in the presence of organic solvents. Accordingly, those metal compounds which are stable in an alkaline medium are also particularly suitable for carrying out the process, examples being complex chromium compounds or cobalt compounds of aliphatic dicarboxylic acids or hydroxycarboxylic acids, such as, for example, of oxalic acid, of lactic acid, of citric acid and especially of tartaric acid, or complex chromium compounds of aromatic hydroxycarboxylic acids such as, for example, of salicylic acid. Simple compounds of divalent cobalt, such as cobalt sulphate or cobalt acetate, or optionally freshly precipitated cobalt hydroxide can also, and in particular with advantage, be used as cobalt-donating agents according to the present process.

The conversion of the azo compounds of the formula (1) into the complex metal compounds is advantageously carried out with warming, in an open vessel or under pressure, optionally in the presence of suitable additives, for example in the presence of salts of organic acids, of bases, of organic solvents or of further agents which promote complex formation and/or promote the splitting off of the alkyl radical of the alkoxy group which may be present in the o-position to the azo group.

Instead of starting from o,o'-dihydroxyazo compounds, it is also possible to use the corresponding o-alkoxy-o'-hydroxyazo compounds; in this case, the alkyl group of the o-alkoxy radical is split off during the metallisation and the same metal complexes as from the dihydroxyazo compounds are obtained.

A particular embodiment of the present process is characterised by starting from mixtures of different metallisable azo compounds which correspond to the initially mentioned general definition, or of which at least one corresponds to this definition. The treatment with the chromium-donating or cobalt-donating agents is here again carried out in such a way that chromium-containing or cobalt-containing complexes are produced which per molecule of azo compound contain one or half an atom of chromium or half an atom of cobalt bonded as a complex.

Valuable compounds are the cobalt compounds and chromium compounds of this nature which contain two o,o'-dihydroxymonoazo compounds corresponding to the general formula (1), both of which have the same composition.

As diazo components which can be used for the manufacture of the compounds of the formula (1) according to the invention, or of the corresponding heavy metal complexes, the diazo compounds of the following amines may be mentioned: aminobenzene, 1-amino-4-chlorobenzene, 1-amino-4-bromobenzene, 1-amino-4-methylbenzene, 1-amino-4-nitrobenzene, 1-amino-4-cyanobenzene, 1-amino-2,5-dicyanobenzene, 1-amino-4-methyl-sulphonylbenzene, 1-amino-4-carbalkoxybenzene, 1-amino-2,4-dichlorobenzene, 1-amino-2,4-dibromobenzene, 1-amino-2-methyl-4-chlorobenzene, 1-amino-2-trifluoromethyl-4-chlorobenzene, 1-amino-2-cyano-4-chlorobenzene, 1-amino-2-carbomethoxy-4-chlorobenzene, 1-amino-2-carbomethoxy-4-nitrobenzene, 1-amino-2-chloro-4-cyanobenzene, 1-amino-2-chloro-4-nitrobenzene, 1-amino-2-bromo-4-nitrobenzene, 1-amino-2-chloro-4-carboethoxybenzene, 1-amino-2-chloro-4-methylsulphonylbenzene, 1-amino-2-methylsulphonyl-4-chlorobenzene, 1-amino-2,4-dinitro-6-methyl-sulphonylbenzene, 1-amino-2,4-dinitro-6-(2'-hydroxyethylsulphonyl)-benzene, 1-amino-2,4-dinitro-6-(2'-chloroethylsulphonyl)-benzene, 1-amino-2 -methylsulphonyl-4-nitrobenzene, 1-amino-4-methylsulphonyl-2-nitrobenzene, 1-amino-2,4-dinitrobenzene, 1-amino-2,4-dicyanobenzene, 1-amino-2-cyano-4-methylsulphonylbenzene, 1-amino-2,6-dichloro-4-cyanobenzene, 1-amino-2,6-dichloro-4-nitrobenzene, 1-amino-2,4-dicyano-6-chlorobenzene, 4-aminobenzoic acid cyclohexyl ester, 1-amino-2,4-dinitro-6-chlorobenzene and especially 1-amino-2-cyano-4-nitrobenzene, 1-aminobenzene-2, -3- or -4-sulphonic acid amides, such as the N-methylamide or N,N-dimethylamide or N,N-diethylamide, 2-aminonaphthalene-6-sulphonic acid N,γ-isopropoxypropylamide, 1-aminobenzene-2-, -3- or -4-sulphonoc acid N,γ-isopropoxypropylamide, 1-aminobenzene-2-, -3- or -4-sulphonic acid N-isopropylamide, 1-aminobenzene-2-, -3- or -4-sulphonic acid N,γ-methoxypropylamide, 1-aminobenzene-2-, -3- or -4-sulphonic acid N,N-bis-(β-hydroxy-ethyl)-amide, 1-amino-4-chlorobenzene-2-sulphonic acid amide and the N substituted derivatives, 4-aminoazobenzene, 3,2'-dimethyl-4-aminoazobenzene, 2-methyl-5-methoxy-4-aminoazobenzene, 4-amino-2-nitroazobenzene, 2,5-dimethoxy-4-aminoazobenzene, 4'-methoxy-4-aminoazobenzene, 2-methyl-4'-methoxy-4-aminoazobenzene, 3,6,4'-trimethoxy-4-aminoazobenzene, 4'-chloro-4-aminoazobenzene, 2'- or 3'-chloro-4-aminoazobenzene, 3-nitro-4-amino-2',-4'-dichloroazobenzene, 4-aminoazobenzene-4'-sulphonic acid amide, 1- or 2-aminonaphthalene, 4-methoxy-5-chloro-2-aminophenol, 6-acetylamino-4-chloro-2 -aminophenol, 6-nitro-4-chloro-2-aminophenol, 6-nitro 4-methyl-2-aminophenol, 3-amino-4-hydroxy-acetophenone, 6-nitro 4-acetylamino-2-aminophenol, 5-nitro-3-amino-4-hydroxyacetophenone, 2-aminophenol-4-carboxylic acid amide, 4,6-dichloro-2-aminophenol, 3,4,6-trichloro-2-aminophenol, 4-nitro-6-chloro-2-aminophenol, 6-nitro- or 6-chloro-2-aminophenol-4-sulphonic acid amide, 4-nitro-2-aminophenol-5- or -6-sulphonic acid amide, 2-aminophenol-5-methylsulphone, 2-aminophenol, 4- or 5-nitro-2-aminophenol, 4- or 5-chloro-2-aminophenol, 4,5-dichloro-2-aminophenol, 4-chloro-5-nitro-2-aminophenol, 2-aminophenol-4- or -5-sulphonic acid, 3,4,6-trichloroaminophenol, 4-chloro-2-aminophenol-6-sulphonic acid, 6-chloro-2-aminophenol-4-sulphonic acid, 4-nitro-2-aminophenol-6-sulphonic acid, 6-nitro-2-aminophenol-4-sulphonic acid, 2-aminophenol-4,6-disulphonic acid, 4,6-dinitro-2-aminophenol, 6-acetylamino-2-aminophenol-4-sulphonic acid, 4-acetylamino-2-aminophenol-6-sulphonic acid, 4-methyl-2-aminophenol, 4-methoxy-2-aminophenol, 2-aminophenol-4-sulphonamide, 2-aminophenol-4-sulphone-N-β-hydroxyethylamide, 2-aminophenol-4-sulphone-N-methylamide, 2-aminophenol-5-sulphonamide, 4-chloro-2-aminophenol-5- or -6-sulphonamide, 2-aminophenol-4-sulphone-N,N-dimethylamide, 2-aminophenol-4-methylsulphone, 2-aminophenol-4-ethylsulphone, 6-acetylamino-4-nitro-2-aminophenol, 2-aminophenol-4,β-hydroxyethylsulphone, anthranilic acid, 2-amino-3-naphthoic acid, 4- or 5-chloroanthranilic acid, 4- or 5-nitroanthranilic acid, 4- or 5-acetylaminoanthranilic acid, 4- or 5-sulphoanthranilic acid, anthranilic acid 4-sulphonamide, anthranilic acid 4- or 5,β-hydroxyethylsulphone, anthranilic acid 4- or 5-ethylsulphone, 4-chloro-2-aminophenol-5-sulphonic acid N-methylamide, 4- or 5-benzoylaminoanthranilic acid, 2-anisidine, 4- or 5-chloro-2-anisidine, 4- or 5-nitro-2-anisidine, 2-anisidine-4- or -5-sulphonic acid, 2-methoxy-5-methylaniline, 2,5-dimethoxyaniline, 2-anisidine-4- or -5-β-hydroxyethylsulphone, 2-amino-1-naphthol-4,8-disulphonic acid, 1-amino-2-naphthol-4-sulphonic acid, 1-amino-2-naphthol-4-sulphonamide, 6-nitro-1-amino-2-naphthol-4-sulphonic acid, 6-acetylamino-1-amino-2-naphthol-4-sulphonic acid, 4-(2', 5'-disulphophenylazo)-2-methoxy-5-methylaniline, 4-(2', 5'-disulphophenylazo)-2,5-dimethoxyaniline, 4-(2', 5'-disulphophenylazo)-2-methoxy-1-naphthylamino-6-sulphonic acid, 4-(1',5'-disulphonaphth-2'-ylazo)-2,5-dimethoxyaniline, 4-(2',3'- or 4'-sulphophenylazo)-2-methoxyaniline, dianisidine, benzidine-3,3'-dicarboxylic acid, 4-(2'-, 3'- or 4'-sulphophenylazo)-2-methoxy-5-methylaniline, 4-(2'-, 3'- or 4'-sulphophenylazo)-2,5-dimethoxyaniline, 4-(2',5'- or 3',5'-disulphophenylazo)-2-methoxyaniline, 4-(3',5'-disulphophenylazo)-2-methoxy-5-methylaniline, 4-(3',5'-disulphophenylazo)-2,5-dimethoxyaniline 4-(2'-carboxy-4'- or -5'-sulphophenylazo)-2-methoxyaniline, 4-(2'-carboxy-4- or -5'-sulphophenylazo)-2,5-dimethoxyaniline, 4-(2'-carboxy-4'- or -5'-sulphophenylazo)-2-methoxy-5-methylaniline, 4-(6',8'-disulphonaphth-2'-ylazo)-2-methoxyaniline, 4-(6',8'-disulphonaphth-2'-ylazo)-2-methoxyaniline, 4-(6',8'-disulphonaphth-2'-ylazo)-2-methoxy-5-methoxyaniline, 4-(6',8'-disulphonapath-2'-ylazo)-2,5-dimethoxyaniline, 4-phenylazo-2-aminophenol, 2-(N,N-dimethylsulphonylamino)-aniline and 2-(N,N-ditosylamino)-aniline.

The azo compounds already mentioned which do not correspond to the formula (2), and which may be present, in addition to an azo compound of the formula (2), as ligands in 1:2-chromium or cobalt, complexes, are also derived from the abovementioned diazo components and from the following coupling components: phenole and phenole substituted by lower alkyl, acylamino (acylamino having the meaning given above), sulfo, amino, hydroxy, lower alkanoyl, especially acetyl, arylazo, wherein "aryl" designates primarily phenyl and phenyl substituted by sulfo, hydroxy, acylamino, nitro, chloro, bromo, lower alkyl and lower alkoxy; naphthole and naphthole substituted by sulfo, hydroxy, acylamino, sulfonamido and sulfonamido mono- or disubstituted at the nitrogen atom by lower alkyl, hydroxyalkyl, lower alkoxyalkyl, cyanoalkyl, aralkyl especially benzyl, $C_5$–$C_9$-cycloalkyl especially cyclohexyl or aryl especially phenyl, carboxyphenyl, methylphenyl, nitro- or chlorophenyl, lower alkylsulfonyl, lower hydroxy-, chloro-, lower alkoxy- or cyanoalkylsulfonyl, arylsulfonyl, such as phenylsulfonyl, chlorophenylsulfonyl and methylphenylsulfonyl, amino, phenylamino and phenylamino substituted in the phenyl nucleus by sulfo or amino;
naphthylamines, such as 2-amino-naphthaline, 6-bromo-, 6-methoxy- or 6-methyl-2-aminonaphthaline, 2-aminonaphthaline-6-sulfonic acid;
6-hydroxypyridones substituted in position 1 by lower alkyl, such as methyl or isopropyl, lower hydroxyamino- or alkoxyalkyl such as β-hydroxyethyl, β-aminoethyl Y-isopropoxypropyl, amino or substituted amino such as dimethylamino or diethylamino, in position 3 by cyano or carbonamido and in position 4 by lower alkyl primarily methyl;
5-pyrazolones substituted in position 1 by phenyl or naphthyl substituted by sulfo, chloro, lower alkyl, lower alkoxy, amino, nitro, sulfonamido, lower alkylsulfonamido, and lower alkyl- or hydroxy-, chloro-, alkoxy- or cyanoalkylsulfonyl; acetoacetanilides and benzoylacetanilides optionally substituted in the anilide nucleus by lower alkyl, lower alkoxy, sulfo, lower alkylsulfonyl- or lower hydroxy-, chloro-, alkoxy- or cyanoalkylsulfonyl, sulfonamido, lower alkylsulfonamido, chloro and amino. As examples of suitable coupling components there may be mentioned: p-cresol, 3,4-dimethylphenol, 2,4-dimethylphenol, 2- or 3-acetylamino-4-methylphenol, 4-t-butylphenol, 2-hydroxy-5,6,7,8-tetrahydronaphthalene;
2-hydroxy-3-sulphonic acid-5,6,7,8-tetrahydronaphthalene, 2-carboethoxyamino-4-methylphenol, resorcinol, m-aminophenol, 2,4-dihydroxyacetophenone, 2,4-dihydroxyazobenzene, 2,4-dihydroxyazobenzene-2'- or -4'-sulphonic acid, 2,4-dihydroxyazobenzene-2',5'-disulphonic acid,2,4-dihydroxy-4'-nitroazobenzene, 2,2',4-trihydroxyazobenzene-3',5'-disulphonic acid, 2,4-dihydroxy-4'- or -5'-(acetylamino)-azobenzene-2'-sulphonic acid, 4-(2'',4''-dihydroxyphenylazo)-4'-nitrostilbene-2,2'-disulphonic acid; naphthols, such as, for examaple, 2-naphthol, 1,3- or 1,5-dihydroxynaphthalene, 2-naphthol-6-sulphonic acid, 1,8-dihydroxynaphthalene-3,6-disulphonic acid, 1,3-dihydroxynaphthalene-5-, -6- or -7-sulphonic acid, 1,3-dihydroxynaphthalene-5,7-disulphonic acid, 2-naphthol-6-sulphonamide, 2-naphthol-6-β-hydroxyethylsulphone, 1-amino-7-naphthol, 1-acetylamino-7-naphthol, 1-propionylamino-7-naphthol, 1-carbomethoxyamino-7-naphthol, 1-carboethoxyamino-7-naphthol, 1-carbopropoxy-amino-7-naphthol, 1-dimethylaminosulphonylamino-7-naphthol, 2-amino-5-naphthol-7-sulphonic acid, 2-amino-5-naphthol-1,7-disulphonic acid, lamino-4-naphthol, 2-amino-6-naphthol, 2-amino-6-naphthol-8-sulphonic acid, 2-acetylamino-5-naphthol-7-sulphonic acid, 2-benzoylamino-5-naphthol-7-sulphonic acid, 2-phenylamino-5-naphthol-7-sulphonic acid, 2-(3'-sulphoanilino)-5-naphthol-7-sulphonic acid, 2-amino-8-naphthol-6-sulphonic acid, 2-acetylamino-8-naphthol-6-sulphonic acid, 2-(3'- or 4'-aminobenzoylamino)-5-naphthol-7-sulphonic acid, 2-(3' - or 4'-aminobenzoylamino)-8-naphthol-6-sulphonic acid, 1-(3'- or 4'-aminobenzoylamino)-8-naphthol-3,6-disulphonic acid, 2-(3'- or 4'-aminoanilino)-5-naphthol-7-sulphonic acid, 2-(3'- or 4'-aminoanilino)-8-naphthol-6-sulphonic acid, 1-(3'- or 4'-aminoanilino)-8-naphthol-3,6-disulphonic acid, 2-(3'-amino-4'-sulphoanilino)-5-naphthol-7-sulphonic acid, 2-phenyl-amino-8-naphthol-3,6-disulphonic acid, 2-(4'-amino-3'-sulphoanilino)-5-naphthol-7-sulphonic acid, 2-(4'-amino-3'-sulphoanilino)-8-naphthol-6-sulphonic acid, 1-amino-8-naphthol-3,6-, -2,4- or -4,6-disulphonic acid, 1-amino-8-naphthol-4-sulphonic acid, 1-phenylamino-8-naphthol-4-sulphonic acid, 1-amino-5-naphthol-7-sulphonic acid, 1-acetylamino-8-naphthol-3,6- or -4,6-disulphonic acid, 1-benzoylamino-8-naphthol-3,6- or -4,6-disulphonic acid, 1-phenylamino-8-naphthol-3,6- or -4,6-disulphonic acid, 1-naphthol-4-sulphonic acid, 1-naphthol-4,6-disulphonic acid, 2-naphthol-6,8-disulphonic acid, 1-naphthol-5-sulphonic acid, 2-naphthol-3,6-disulphonic acid, 2-naphthol-3,6,8-trisulphonic acid, 2-amino-8-naphthol-3,6-disulphonic acid, 6-acetyl-2-naphthol, 4-acetyl-2-naphthol, 4-methoxy-1-naphthol, 4-acetyl-1-naphthol, 1-naphthol-3-, -4- or -5-sulphonamide, 2-naphthol-3-, -4-, -5-, -6-, -7- or -8-sulphonamide, 5,8-dichloro-1-naphthol, 2-methylamino-5-naphthol-7-sulphonic acid, 2-methylamino-8-naphthol-6-sulphonic acid, 1-butylamino-8-naphthol-3,6-disulphonic acid, 1-naphthol-3,6,8-trisulphonic acid, 6-β-hydroxyethylsulphonyl-2-naphthol-3-sulphonic acid, 1-naphthol-3,6- or -3,8-disulphonic acid, 2-(4'-nitrophenylazo)-1-amino-8-naphthol-3,6- or -3,8-disulphonic acid, 2-(4'-nitrophenylazo)-1-amino-8-naphthol-3,6-disulphonic acid, 2-(2'- or 4'-sulphophenylazo)-1-amino-8-naphthol-3,6-disulphonic acid, 1,4-dichloro-8-naphthol, 1-naphthol-8-sulphonic acid, 2-(2',5'-disulphophenylazo)-1-amino-8-naphthol-3,6-disulphonic acid, 2-naphthol-7- or -8-sulphonic acid; heterocyclic coupling components, such as barbituric acid, 2,6-dihydroxy-3-cyano-4-methyl-pyridine; pyridone, such as, for example, 1-methyl-3-cyano-4-ethyl-6-hydroxy-pyridone, 1-amino-3-cyano-4-methyl-6-hydroxy-pyridone, 1-phenyl-3-carbamido-4-methyl-6-hydroxy-pyridone, 2,4-dihydroxyquinoline; 5-pyrazolones, such as 3-methyl-5-pyrazolone, 1,3-dimethyl-5-pyrazolones, 5-pyrazolone-3-carboxylic acid and its amides, preferably 1-aryl-5-pyrazolones, such as 1-phenyl-3-methyl-5-pyrazolone, 1-(2'-, 3'- or 4'-methylphenyl)-3-methyl-5-pyrazolone, 1-(2'-, 3'- or 4'-sulphophenyl)-3-methyl-5-pyrazolone, 1-[3 '- or 4'-($\beta$-hydroxyethylsulphonyl)-phenyl]-3-methyl-5-pyrazolone, 1-phenyl-3-carboxy-5-pyrazolone, 1-(3'- or 4'-aminophenyl)-3-methyl- 5-pyrazolone, 1-(2'-methoxyphenyl)-3-methyl-5-pyrazolone, 1-(2'-, 3'- or 4'-chlorophenyl)-3-methyl-5-pyrazolone, 1-(3'- or 4'-aminophenyl)-3-carboxy-5-pyrazolone, 1-(3'-amino-4'-sulphophenyl)-3-(carboxy- or methyl)-5-pyrazolone, 1-(4'-amino-3'-sulphophenyl)-3-carboxy- or methyl)-5-pyrazolone, 1-(2'-, 3'- or 4'-nitrophenyl)-3-methyl-5-pyrazolone, 1-(2', 5'- or 3',4'-dichlorophenyl)-3-methyl-5-pyrazolone, 1-(2', 3'- or 4'-sulphamlyphenyl)-3-methyl-5-pyrazolone, 1-(2'-, 3'- or 4'-methylsulphonylphenyl)-3-methyl-5-pyrazolone, 1-phenyl-5-pyrazolone-3-carboxylic acid cresidide, 1-phenyl-5-pyrazolone-3-carboxylic acid 2'-toluidide, 1-phenyl-5-pyrazolone-3-carboxylic acid anilide, 1,3-diphenyl-5-pyrazolone, 1-(2'-, 3'- or 4'-N-methylsulphamylphenyl)-3-methyl-5-pyrazolone, 1-(6'-chloro-3'-methyl-4'-sulphophenyl)-3-methyl-5-pyrazolone, 1-(2',5'-dichloro-4' -sulphophenyl)-3-methyl-5-pyrazolone, 1-(2'-methyl-5'-sulphophenyl)-3-methyl-5-pyrazolone, 1-(4'-chloro-2'-sulphophenyl)-3-methyl-5-pyrazolone, 1-(6'-chloro-4'-sulpho-2'-methylphenyl)-3-carboethoxy-5-pyrazolone, 1-(2',5'-disulphophenyl)-3-methyl-5-pyrazolone, 1-(4'-sulphophenyl)-3-carboxy-5-pyrazolone, 1-(2'-, 3'- or 4'-carboxyphenyl)-3-methyl-5-pyrazolone, 1-(6'-chloro-4'-sulpho-2'-methylphenyl)-3-methyl-5-pyrazolone, 3-carboxy-5-pyrazolone; acetoacetic acid amides, preferably acetoacetanilides and benzoylacetanilides, such as, for example, acetoacetanilide, acetoacet-4-($\beta$-hydroxyethylsulphonyl)-anilide, acetoacet-o-anisidide, acetoacet-o-toluidide, acetoacet-o-chloroanilide, acetoacetanilide-3- or -4-sulphonic acid, acetoacet-3- or -4-aminoanilide, acetoacet-m-xylidide, acetoacetanilide-2-, -3- or -4-carboxylic acid, benzoylacetanilide, benzoylacetanilide-3- or -4-sulphonic acid, benzoylacet-3- or -4-aminoanilide, acetoacetanilide-4-sulphonamide; naphthylamines, such as, for example, 2-naphthylamine, 1-naphthylamine, 1-naphthylamine-4-sulphonic acid, 2-methylaminonaphthalene, 2-aminonaphthalene-6-sulphonamide, 2-amino-8-naphthol-6-sulphonic acid, 2-methylamino-8-naphthol-6-sulphonic acid, 2-phenylamino-8-naphthol-6-sulphonic acid, 2-phenylaminonaphthalene, 2-(3'-chlorophenyl)-aminonaphthalene, 2-(2'-carboxyphenyl)-aminonaphthalene, 2-aminonaphthalene-6-sulphonic acid, and 2-aminonaphthalene-6-sulphonic acid N-methylamide.

Compounds of the formula (1) or the corresponding heavy metal complexes which contain one or more reactive groups can be manufactured by using diazo components or coupling components which already contain reactive groups. In many cases it is, however, also possible to introduce reactive groups subsequently into the azo compounds. The introduction can take place after coupling or after metallisation. Compounds of particular interest are those of the formula (1), or heavy metal complexes thereof, which contain a 6-membered heterocyclic radical bonded via an amino group or an aliphatic reactive radical containing not more than three carbon atoms.

The introduction of the reactive radical is preferably effected by acylation of appropriate azo compounds or coupling components which contain an amino group which can be acylated, or of appropriate diazo components which in addition to the amino group to be diazotised also contain a further amino group which can be acylated, or a group, such as, for example, the nitro group or the acetylamino group, which can be converted, for example by reduction or saponification, into an amino group which can be acylated.

As appropriate starting compounds (diazo components or coupling components) which, as described above, are suitable for the introduction of a reactive radical, there may, for example, be mentioned:

Diazo components: 1,3-diaminobenzene- 4-sulphonic acid, 1,4-diaminobenzene-2-sulphonic acid, 1,4-diaminobenzene-2,5-or -2,6-disulphonic acid, 1-amino-4-nitrobenzene, 1-amino-2-chloro-4-nitrobenzene, 6-acetylamino-4-chloro-2-aminophenol, 6-nitro-4-methyl-2-aminophenol, 4-nitro-2-aminophenol-6-sulphonic acid, 6-acetylamino-1-amino-2-naphthol-4-sulphonic acid and other compounds, for example compounds mentioned in the recital of possible diazo components.

Coupling components: 2-acetylamino-4-methylphenol, m-aminophenol, 2,4-dihydroxy-4'-nitroazobenzene, 1-amino-7-naphthol, 2-amino-5-naphthol-7-sulphonic acid, 2-acetylamino-5-naphthol-7-sulphonic acid, 1-(3'- or 4'-aminoanilino)-8-naphthol-3,6-disulphonic acid, 1-(4'-amino-3'-sulphophenyl)-3-methyl-5-pyrazolone, 2-naphthylamine and other compounds, for example compounds mentioned in the list of possible coupling components.

As azo compounds of the formula (1), or further ligands, not corresponding to the formula (1), in 1:2-heavy metal complexes, into which reactive radicals (that is to say after coupling or after metallisation, see above) can be introduced, it is for example possible to use the coupling products of the abovementioned diazo components or coupling components with appropriate compounds which can be coupled, and these can optionally in turn contain amino groups which can be acylated, so that compounds of the formula (1) or corresponding heavy metal complexes are produced, which contain more than one reactive group in the finished molecule or complex.

As acylating agents which contain a reactive radical in addition to the acylating position, it is in particular possible to use the halides or anhydrides of organic acids which contain easily replaceable atoms or groups of atoms.

As acylating agents which contain a fibre-reactive radical, the following may, for example, be mentioned: chloroacetyl chloride or bromoacetyl chloride, $\beta$-chloropropionyl chloride or $\beta$-bromopropionyl chloride, $\alpha,\beta$-dichloropropionyl chloride or $\alpha,\beta$-dibromopropionyl chloride, chloromaleic anhydride, carbyl sulphate, acrylyl chloride, $\beta$-chloroacrylyl chloride or $\beta$-bromoacrylyl chloride, $\alpha$-chloroacrylyl chloride or $\alpha$-bromoacrylyl chloride, $\alpha$, 62 -dichloroacrylyl chloride or $\alpha,\beta$-dibromoacrylyl chloride, trichloroacrylyl chloride, chlorocrotonyl chloride, propiolic acid chloride, 3,5-dinitro-4-chlorobenzene-sulphonic acid chloride or -carboxylic acid chloride, 3-nitro-4-chlorobenzene-sulphonic acid chloride or -carboxylic acid chloride, 2,2,3,3-tetrafluorocyclobutane-1-carboxylic acid chloride, β-chloroethylsulphonylendomethylene-cyclohexanecarboxylic acid chloride, acrylylsulphonyl-endomethylene-cyclohexanecarboxylic acid chloride, and above all heterocyclic acid halides and their derivatives, such as the 2-chlorobenzoxazolecarboxylic acid chlorides, 2-chlorobenzthiazolecarboxylic acid chlorides or -sulphonic acid chlorides and above all the following compounds, which possess at least 2 nitrogen atoms as hetero-atoms of a 6-membered structure: 4,5-dichloro-1-phenylpyridazonecarboxylic acid chloride or -sulphonic acid chloride, 4,5-dichloropyridazonepropionic acid chloride, 1,4-dichlorophthalazinecarboxylic acid chloride or -sulphonic acid chloride, 2,3-dichloroquinoxalinecarboxylic acid chloride or -sulphonic acid chloride, 2,4-dichloroquinazolinecarboxylic acid chloride or -sulphonic acid chloride, 2-methanesulphonyl-4-chloro-6-methylpyrimidine, tetrachloropyridazine, 2,4-bis-methanesulphonyl-6-methylpyrimidine, 2,4,6-tri- or 2,4,5,6-tetrachloropyrimidine, 2,4,6-tri- or 2,4,5,6-tetrabromopyrimidine, 2-methanesulphonyl-4,5-dichloro-6-methylpyrimidine, 2,4-dichloropyrimidine-5-sulphonic acid, 5-nitro- or 5-cyano-2,4,6-trichloropyrimidine, 2,6-bis-methanesulphonylpyridine-4-carboxylic acid chloride, 2,4-dichloro-5-chloromethyl-6-methylpyrimidine, 2,4-dibromo-5-bromomethyl-6-methylpyrimidine, 2,4-dichloro-5-chloromethylpyrimidine, 2,4-dibromo-5-bromoethylpyrimidine, 2,5,6-trichloro-4-methylpyrimidine, 2,6-dichloro-4-trichloromethylpyrimidine or especially 2,4-dimethanesulphonyl-5-chloro-6-methylpyrimidine, 2,4,6-trimethanesulphonyl-1,3,5-triazine, 2,4-dichloropyrimidine, 3,6-dichloropyridazine, 3,6-dichloropyridazine-5-carboxylic acid chloride, 2,6-dichloro- or 2,6-dibromo-4-carboethoxypyrimidine, 2,4,5-trichloropyrimidine, 2,4-dichloropyrimidine-6-carboxylic acid chloride, 2,4-dichloropyrimidine-5-carboxylic acid chloride, 2,6-dichloro- or 2,6-dibromopyrimidine-4- or -5-carboxylic acid amide or -sulphonic acid amide or -4- or -5-sulphonic acid chloride, 2,4,5,6-tetrachloropyridazine, 5-bromo-2,4,6-trichloropyrimidine, 5-acetyl-2,4,6-trichloropyrimidine, 5-nitro-6-methyl-2,4-dichloropyrimidine, 2-chlorobenzthiazole-6-carboxylic acid chloride, 2-chlorobenzthiazole-6-sulphonic acid chloride, 5-nitro-6-methyl-2,4-dichloropyrimidine, 2,4,6-trichloro-5-chloropyrimidine, 2,4,5,6-tetrafluoropyrimidine, 4,6-difluoro-5-chloropyrimidine, 2,4,6-trifluoro-5-chloropyrimidine, 2,4,5-trifluoropyrimidine, 2,4,6-trichloro (-tribromo or -trifluoro)-1,3,5-triazines, as well as 4,6-dichloro (-dibromo or -difluoro)-1,3,5-triazines which are substituted in the 2-position by an aryl or alkyl radical, for example a phenyl methyl or ethyl radical, or by the radical of an aliphatic or aromatic mercapto compound bonded via the sulphur atom, or hydroxy compound bonded via the oxygen atom, or especially by a $NH_2$ group or by the radical of an aliphatic, heterocyclic or aromatic amino compound bonded via the nitrogen atom. As such compounds, the radicals of which can be bonded to the triazine nucleus in the 2-position by reaction with trihalogenotriazines, the following may for example be mentioned: aliphatic or aromatic mercapto compounds or hydroxyl compounds, such as thioalcohols, thioglycollic acid, thiophenols, alkoxyalkanols, methyl alcohol, ethyl alcohol, isopropyl alcohol, glycollic acid, phenol, chlorophenols or nitrophenols, phenolcarboxylic and phenolsulphonic acids, naphthols, naphtholsulphonic acids and the like, but especially ammonia and compounds containing amino groups which can be acylated, such as hydroxylamine, hydrazine, phenylhydrazine, phenylhydrazinesulphonic acids, glycol monoalkyl ethers, methylamine, ethylamine, isopropylamine, methoxyethylamine, methoxypropylamine, dimethylamine, diethylamine, methylphenylamine, ethylenephenylamine, chloroethylamine, ethanolamine, propanolamines, benzylamine, cyclohexylamine, morpholine, piperidine, piperazine, aminocarbonic acid esters, aminoacetic acid ethyl ester, aminoethanesulphonic and N-methylaminoethanesulphonic acid, but above all aromatic amines, such as aniline, N-methylaniline, toluidines, xylidines, chloroanilines, p- and m-aminoacetanilide, aminophenols, anisidine, phenetidine and especially anilines containing acid groups, sulphanilic acid, methanilic acid, orthanilic acid, anilinedisulphonic acid, aminobenzylsulphonic acid, aniline-ω-methanesulphonic acid, aminobenzenedicarbonic acids, naphthylaminomonosulphonic, -disulphonic and -trisulphonic acids, aminobenzoic acids, such as 2-hydroxy-5-aminobenzoic acid, and also coloured compounds, or compounds possessing dyestuff character, for example 4-nitro-4'-aminostilbenedisulphonic acid, 2-nitro-4'-aminodiphenylamino-4,3'-stilbene-disulphonic acid, 2-nitro-4'-aminodiphenylamine-4,3'-disulphonic acid and especially aminoazo dyestuffs or aminoanthraquinones or phthalocyanines which still contain at least one reactive amino group.

The introduction of the substituent which is in the 2-position of the triazine radical can also take place after the condensation with the starting diamine or after the reaction, according to the invention, to give the azo compound of the formula (1).

Apart from the fibre-reactive radicals which can be introduced by acylation, further fibre-reactive radicals which may be mentioned are, for example, the vinylsulphone, β-sulphatoethylsulphone or β-thiosulphatoethylsulphone, β-thiosulphatopropionylamide, β-thiosulphatoethylsulphonylamide, or sulphonic acid-N,β-sulphatoethylamide group, which are introduced into the diazo component in a different manner, for example by ester formation or thioester formation.

As compounds which contain a fibre-reactive radical which cannot be introduced by acylation, and in which the fibre-reactive radical is thus preferably not bonded via an amino group but is directly bonded to the benzene radical, the sulpho-esters of the following sulphones may, in particular, be mentioned: 1-amino-2-methoxy-5-(β-hydroxyethyl)-phenylsulphone, 1-aminobenzene-3- or -4-β-hydroxyethylsulphone, 1-amino-2-methyl-benzene-5-β-hydroxyethylsulphone, 1-amino-4-(β-hydroxyethylsulphonylpropionylaminomethyl)-benzene, 1-amino-4-(β-hydroxyethylsulphonylamino)-benzene, and also reactive compounds obtainable via corresponding methylols by Einhorn's method, such as, for example, 1-amino-4-chloroacetylaminomethylbenzene or 1-amino-3-chloroacetylaminomethyl-benzene-6-sulphonic acid.

The condensation with the acid halides or anhydrides or with the heterocyclic halogen compounds is appropriately carried out in the presence of acid-binding agents such as, for example sodium carbonate. In all these reactions it is of course necessary to proceed in such a way that an unsaturated bond or a replaceable halogen atom still remains in the end product.

The azo compounds obtainable according to the present process and its variants, and their heavy metal complexes, are new; they are suitable for dyeing and printing the most diverse substances, but above all for dyeing animal materials, such as silk, leather and especially wool, though also for dyeing and printing synthetic fibres of polyamides or polyurethanes, polyacrylonitrile fibres and the like.

If an anionic charge is not present, that is to say if no sulphonic acid groups or the like are present, the solubility in water of the azo compounds according to the invention and of their metal complex compounds is greatly reduced. Instead, far better solubility in organic solvents results. If no substituents which can be solvated, such as, for example, a sulphonamide group or nitro group, are present, the solubility in organic solvents is only moderate.

The mixed complexes with one or more sulphonic acid groups are especially suitable for use as dyestuffs for wool, silk, leather and especially polyamides. The mixed complexes containing sulphonamide groups can be used as lacquer dyestuffs and as dyestuffs for the spin-dyeing of polyamides. If the mixed complexes which possess a fibre-reactive group contain two or more sulphonic acid groups, they can be employed as reactive dyestuffs in the usual manner; if sulphonic acid groups are entirely absent, the products are reactive dispersion dyestuffs.

The heavy metal complexes according to the invention which contain a cationic charge can especially be used as dyestuffs for polyacrylonitrile fibres.

The new dyestuffs can be used for dyeing nitrogen-containing fibres, such as wool and polyamide, for example from baths which range from containing acetic acid to being neutral, suitable dispersing agents being added if appropriate, that is to say when using dyestuffs of only limited solubility in water. Particularly when using complexes of good solubility in water, that is to say complexes containing two or more sulpho groups in the azo dyestuff, dyeing is appropriately carried out with the addition of the auxiliaries which are customary in dyeing.

Furthermore, nitrogen-containing fibres, especially wool, can be dyed in an advantageous manner with the dyestuffs manufactured according to the present process if the fibres are treated, appropriately in a continuous process, for example on a padder, with an aqueous preparation which contains a wool dyestuff and an auxiliary which with water and, if appropriate, additives is capable of forming a system of two liquid phases with a miscibility gap, under conditions where the mixing ratio of the water, optionally containing additives, to the auxiliary lies within the miscibility gap or near it, the miscibility gap is already present at a relatively low content of auxiliary, and the phase which is richer in auxiliary accounts for a substantial part over a large range of the miscibility gap, and thereafter subjecting the material provided with the aqueous preparation to a heat treatment.

The dyeings and prints obtainable with the new dyestuffs are as a rule distinguished by uniformity, by resistance to acid and alkali, by good fastness to light and by good fastness to rubbing; as a rule, they barely change in appearance under artificial light, and in part they show very interesting and valuable shades.

2,3-Dihydroxy-5-bromo-pyridine of the formula

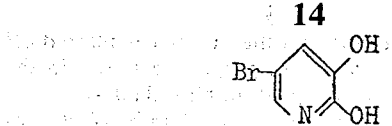

used as a coupling component is also new, can be easily manufactured according to the working instructions given below, and represents a valuable starting product for the manufacture of dyestuffs.

In the examples which follow the parts, unless otherwise stated, denote parts by weight and the percentages denote percentages by weight. The relationship of parts by weight to parts by volume is the same as of the gram to the $cm^3$.

Manufacture of 2,3-Dihydroxy-5-bromopyridine 9.6 parts of freshly distilled furfurol are thoroughly stirred with 66 parts of water and the mixture is cooled to −5°C. 32 parts of bromine are then added dropwise over the course of about 5 hours at 0° to −5°C, with good stirring. The slightly oily reaction product is filtered and excess bromine is removed by suction in vacuo.

14.9 parts of sulphamic acid are added to the clear filtrate, which is made up to 1000 parts with water. The reaction mixture is warmed to about 40°C, until the reaction continues with a slight exothermic effect. Thereafter, the solution is stirred for about a further 30 minutes at 50° to 55°C and is then cooled. After standing for several hours in the cold, the reaction product precipitates in a form which can be filtered easily. 2,3-Dihydroxy-5-bromopyridine is obtained pure by recrystallisation from glacial acetic acid.

EXAMPLE 1

7.7 parts of 4-nitro-2-amino-1-hydroxybenzene are dissolved in 60 parts of water and 7.5 parts of 30% strength hydrochloric acid by warming. The resulting solution is cooled to 5°C by adding ice and is diazotised with 12.5 parts by volume of 4N sodium nitrite solution at 5° to 10°C.

The resulting diazo solution is rendered weakly alkaline to Brilliant Yellow with 15% strength sodium carbonate solution, and is subsequently run dropwise into a solution, cooled to 0°C, of 9.5 parts of 2,3-dihydroxy-5-bromo-pyridine in 150 parts of water, 7.5 parts of sodium carbonate and 5 parts of 30% strength sodium hydroxide. The dyestuff, which only precipitates partly, is completely separated out by adding sodium chloride, filtered off and dried. A compound of the formula

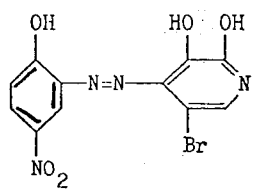

is obtained.

22.7 parts of the dyestuff obtained by coupling 2,3-dihydroxy-5-bromo-pyridine with diazotised 4-nitro-2-amino-1-hydroxybenzene are suspended in 600 parts of water warmed to 50°C.

After adding a solution of 9.3 parts of cobalt-(II) sulphate, 9.3 parts of tartaric acid and 10 parts of sodium hydroxide in 250 parts of water, the mixture is warmed to 80°C. After stirring for about half an hour at 80°C, the metallisation is complete. The resulting dyestuff suspension is caused to separate out completely by adding sodium chloride and the product is filtered off and dried. The dyestuff dyes polyamide fibres, in the presence of a dispersing agent, in blue shades.

If 2-amino-4-chlorophenol or 2-amino-4-chlorophenol-5-sulphamide are used as the diazo component, dyestuffs which dye polyamide fibres similar shades are obtained.

The first column of the Table which follows gives further compounds which can be obtained correspondingly to the preceding Example and which, when reacted with the metals mentioned in the second column to give complexes, produce the colour shades indicated in the third column.

| | I<br>Metal-free azo dyestuff | II<br>Metal | III<br>Shade |
|---|---|---|---|
| 1 | 2-hydroxy-5-sulphamoylphenyl–N=N–(3-hydroxy-2-hydroxy-5-bromopyridyl) | Cobalt | Blue-grey |
| 2 | '' | Chromium | Grey |
| 3 | 2-hydroxy-4-nitrophenyl–N=N–(3-hydroxy-2-hydroxy-5-chloropyridyl) | Copper | Green-blue |
| 4 | '' | Cobalt | Blue-green |
| 5 | 2-carboxyphenyl–N=N–(3-hydroxy-2-hydroxy-5-bromopyridyl) | Nickel | Violet |
| 6 | 2-carboxy-5-chlorophenyl–N=N–(3-hydroxy-2-hydroxy-5-bromopyridyl) | Cobalt | Blue |
| 7 | 2-carboxy-5-nitrophenyl–N=N–(3-hydroxy-2-hydroxy-5-bromopyridyl) | Copper | Blue |
| 8 | '' | Cobalt | Green-blue |
| 9 | 2-hydroxy-3-sulpho-5-chlorophenyl–N=N–(3-hydroxy-2-hydroxy-5-chloropyridyl) | Copper | Grey-blue |

-continued

| | I<br>Metal-free azo dyestuff | II<br>Metal | III<br>Shade |
|---|---|---|---|
| 10 | (structure: 2-hydroxy-3,5-disubstituted phenyl with SO₃H, Cl substituents, azo-linked to dihydroxy-chloro-pyridine) | Nickel | Violet-blue |
| 11 | " | Cobalt | Blue |
| 12 | (structure: 2-hydroxy-phenyl with HO₃S, NO₂ substituents, azo-linked to dihydroxy-bromo-pyridine) | Chromium | Blue-grey |
| 13 | (structure: hydroxy-sulfo-naphthalene azo-linked to dihydroxy-bromo-pyridine) | Copper | Green-blue |
| 14 | " | Nickel | Blue |
| 15 | " | Cobalt | Blue-green |
| 16 | (structure: 2-hydroxy-phenyl with HN-CO-CHBr-CH₂Br and SO₃H substituents, azo-linked to dihydroxy-bromo-pyridine) | Cobalt | Blue-grey |
| 17 | " | Chromium | Grey |
| 18 | (structure: 2-carboxy-phenyl with HN-CO-CH₂Cl substituent, azo-linked to dihydroxy-chloro-pyridine) | Cobalt | Blue |

-continued
| | I<br>Metal-free azo dyestuff | II<br>Metal | III<br>Shade |
|---|---|---|---|
| 19 | 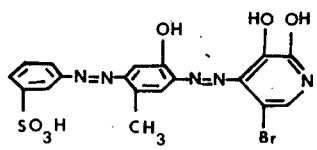 | Copper | Blue |
| 20 | '' | Cobalt | Blue-green |
| 21 | 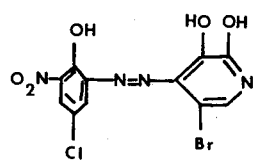 | Cobalt | Blue |
| 22 | '' | Chromium | Grey-blue |
| 23 | 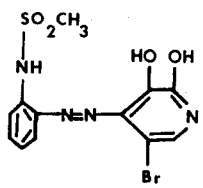 | Copper | Blue |
| 24 | '' | Nickel | Red-violet |
| 25 | '' | Cobalt | Blue |
| 26 | 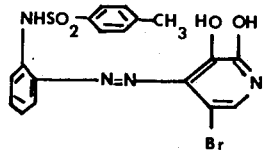 | Copper | Green-blue |
| 27 | (same structure) | Nickel | Violet-blue |
| 28 | '' | Cobalt | Green-blue |
| 29 | '' | Chromium | Grey-blue |
| 30 | 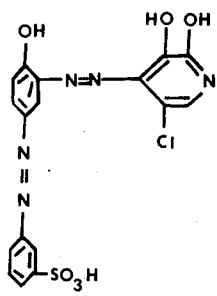 | Copper | Blue-grey |

-continued

| | I<br>Metal-free azo dyestuff | II<br>Metal | III<br>Shade |
|---|---|---|---|
| 31 | " | Cobalt | Green-grey |
| 32 | structure with OH, HO OH, N=N, pyridine with Br, N=N, naphthalene with HO₃S and SO₃H | Copper | Dark blue |
| 33 | " | Nickel | Grey-violet |
| 34 | structure with HO OH pyridine-Br, N=N, phenyl-SO₂-NH-phenyl-COOH | Copper | Blue |
| 35 | " | Nickel | Red-violet |
| 36 | structure with OH, HO OH pyridine-Br, N=N, SO₂-NH-phenyl-COOH | Copper | Blue |
| 37 | " | Nickel | Violet |
| 38 | structure with COOH, HO OH pyridine-Cl, N=N, HO₃S-phenyl | Copper | Violet |

-continued

| I Metal-free azo dyestuff | II Metal | III Shade |
|---|---|---|
| 39 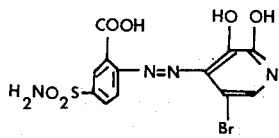 | Nickel | Blue |

EXAMPLE 2

17,75 parts of the dyestuff obtained according to Example 1 from diazotised 4-nitro-2-amino-1-hydroxybenzene and 2,3-dihydroxy-5-bromopyridine, and 42,45 parts of the dyestuff obtained in known manner from diazotised 2-amino-1-hydroxybenzene-4-sulphonic acid-methylamide and 2'-chloroacetic anilide are stirred together with 800 parts of water of 50°C and 10 parts of sodium hydroxide. A solution of 30 parts of crystallised cobalt-II-sulphate in 150 parts of water are added and the metallising mixture is then stirred at 50°–60°C until metal-free starting dyestuffs are no longer detectable. The dyestuff which is precipitated after addition of sodium chloride is filtered off, washed with dilute sodium chloride solution, dried in vacuo, and ground. The new dyestuff produces on wool or polyamide fibres level, dark green dyeings of good fastness properties.

EXAMPLE 3

36,9 parts of the dyestuff obtained by the directions given in Example 1 from diazotised 6-nitro-4-methyl-2-amino-1-hydroxybenzene and 2,3-dihydroxy-5-bromopyridine, and 40,1 parts of the dyestuff obtainable in known manner from diazotised 5-nitro-2-amino-1-hydroxybenzene and 2-aminonaphthalene-6-sulphonic acid-N-methylamide are stirred together with 200 parts of formamide at 70°C. After 26 parts of cobalt-II-acetate-tetrahydrate have been added the metallising mixture is stirred at 70°–80°C until metal-free dyestuff is no longer detectable. The reaction mixture is diluted with 1000 parts of sodium chloride solution and the precipitated dyestuff is filtered off, washed with dilute sodium chloride solution, dried, and ground. The resulting dyestuff dyes polyamide fibres from a slightly acid bath in fast, level bluish grey shades.

EXAMPLE 4

33,8 parts of the dyestuff from diazotised 2-aminobenzene-1-carboxylic acid and 2,3-dihydroxy-5-bromopyridine, and 53,0 parts of the 1:1 chromium complex of the azo dyestuff from diazotised 1-amino-2-hydroxynaphthalene-4-sulphonic acid and 1-phenyl-3-methyl-5-pyrazolone are suspended together in 500 parts of water of 50°C. After regulating a pH of 8 of the reaction mixture is stirred at 90°–95°C until both starting dyestuffs are no longer detectable. The resulting unitary mixed complex of the formula

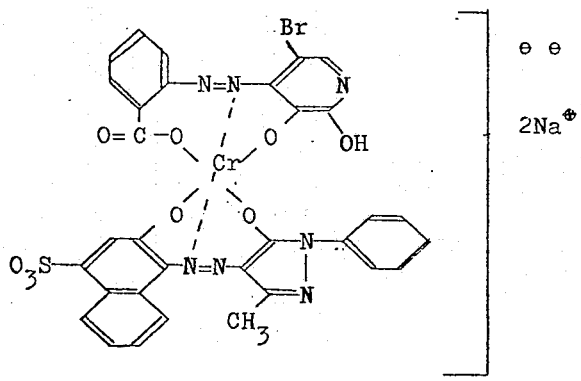

is precipitated from the clear violet solution by addition of sodium chloride, isolated by filtration, washed with sodium chloride solution, dried in vacuo, and ground. The resulting readily water-soluble dyestuff produces bluish violet shades on polyamide fibres or wool knitting yarn from a slightly acid bath.

We claim:
1. A 1:1 or 1:2 chromium, cobalt, copper or nickel complex of a dyestuff of the formula

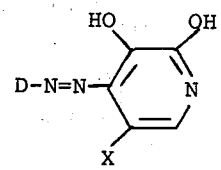

herein
X is fluoro, chloro or bromo,
D is phenyl or napthyl that contains, in the position ortho to the azo bridge; hydroxyl, amino or carboxyl, or if D is phenyl, also methoxy, and where said phenyl is further unsubstituted or substituted by chloro, methoxy, acetylamino, nitro, methyl, acetyl, carbonamido, sulfonamido, methylsulfonyl, sulfo, N-β-hydroxyethylsulfonamido, N-methylsulfonamido, N,N-dimethylsulfonamido, ethylsulfonyl, benzoylamino, β-hydroxyethylsulfonyl, (3'-methoxy, 4'-amino-)-phenyl-, mono- or di-sulfophenylazo, carboxysulfophenylazo, disulfonapthylazo, phenylazo, or an acylamino fiber reactive group wherein acyl is chloroacetyl, bromoacetyl, β-chloropropionyl, β-bromopropionyl, α,β-dichloropropionyl, α,β-dibromopropionyl, chloromaleyl, acrylyl, β-chloroacrylyl, β-bromoacrylyl, α-chlorocryly, α-bromoacrylyl, α,β-dibromoacrylyl, trichloroacylyl, chlorocrotonyl or propionyl, and where said napthyl is further unsubstituted or substituted by sulfo, sulfonamido, nitro, acetylamino or sulfophenylazo.

2. A metal complex according to claim 1, wherein X is chlorine or bromine.

3. A metal complex according to claim 1, wherein said fiber-reactive group is selected from the group consisting of α,β-dibromopropronylamino and α-bromoacryloylamino.

* * * * *